United States Patent [19]
van Ackeren

[11] Patent Number: 5,199,965
[45] Date of Patent: Apr. 6, 1993

[54] BAG FILTER
[75] Inventor: Paul van Ackeren, Duisburg, Fed. Rep. of Germany
[73] Assignee: Mannesmann Aktiengesellschaft, Dusseldorf, Fed. Rep. of Germany
[21] Appl. No.: 876,789
[22] Filed: Apr. 30, 1992
[30] Foreign Application Priority Data
  Apr. 30, 1991 [DE] Fed. Rep. of Germany ....... 4114626
[51] Int. Cl.$^5$ ............................................. B01D 46/04
[52] U.S. Cl. ........................................... 55/293; 55/96; 55/299; 55/302
[58] Field of Search .................. 55/96, 282, 291, 293, 55/299, 302

[56] References Cited
U.S. PATENT DOCUMENTS

| 3,167,415 | 1/1965 | Edwards | 55/302 |
| 3,816,977 | 6/1974 | Gordon et al. | 55/96 |
| 4,759,781 | 7/1988 | Olson | 55/302 X |

Primary Examiner—Charles Hart
Attorney, Agent, or Firm—Cohen, Pontani, Lieberman, Pavane

[57] ABSTRACT

A device for cleaning a bag filter, closed on one side, is arranged on a supporting grid within a housing traversed by the fluid to be cleaned and is provided on the clean-gas side with an injector which is directed into the inside of the fabric filter and is connected to a source of gas of higher pressure than the pressure of the fluid to be filtered. In order to develop the breaking up of the filter cake upon the cleaning of fabric filters in such a manner that as few components as possible of the filter cake are placed in suspended condition and therefore the greatest possible proportion of the filter cake can be removed as a coherent unit, it is proposed that on the clean-gas side (14) of the supporting grid (2a) there be arranged a bag (3) which is expandable by gas pressure, the bag (3) be attached in pressure-tight manner to the injector (10) and the bag (3) be so dimensioned that its circumference corresponds at least to the inside circumference of the supporting grid (2a).

7 Claims, 3 Drawing Sheets

BAG FILTER

FIELD OF THE INVENTION

The present invention relates to a device for removing filter cakes and similar residues on fabric filters. Within the meaning of this application, "nonwovens" are also included within the term "fabric".

BACKGROUND AND SUMMARY OF THE INVENTION

In order to remove dry dust from industrial waste gases, it is known to use fabric filters; see, for example, Federal Republic of Germany OS 26 33 773 or else the book "Dust Removal by Bag Filters and Pocket Filters" by F. Loffler, published by Vieweg-Verlag, 1984, pages 236, et seq. These fabric filters are generally constructed in the shape of a bag and pulled loosely over a supporting grid which they surround with a slight spacing. The fabric surfaces are generally impinged from the outside by the crude gas which is to be purified so that a filter cake of dust particles deposits on the outer surface and the pure gas is lead away through the inside of the bag. In order to assure the filtration function, the fabric must be cleaned at short intervals. This is done by stretching the fabric in the direction opposite the direction of flow of the gas or perpendicular to the direction of flow. Most frequently this is achieved by the fabric being impacted by a gas, for instance compressed air, which is introduced in pulse-like manner by a nozzle into the inside of the bag filter. This method is disadvantageous in that the pressurized cleaning air flows through the filter cloth and partially breaks up the filter cake and the particles of dust detached thereby are deposited on adjacent filter bags. This effect increases with increasing length of the bag.

It is thus an object of the present invention to provide a method and apparatus for breaking up of the filter cake during the cleaning of fabric filters so that as few components of the filter cake as possible are brought into suspended condition, and therefore, the largest possible amount of the filter cake can be removed as a coherent body.

The present invention is directed to a bag filter assembly including a housing, a supporting grid inside the housing, and bag filter having an outer circumference and being arranged on the supporting grid and sufficiently permeable for permitting a gas to be cleaned to pass therethrough from a crude-gas side outside the supporting grid to a clean-gas side inside the supporting grid, a gas injector for directing a stream of gas under pressure from a pressurized gas generating source into the clean-gas side of the supporting grid, the assembly comprising: an expandable bag having an expanded circumference and being disposed at a distance from the filter bag within the clean-gas side of the supporting grid and connected to the gas injector in a pressure-tight manner; the distance of the expandable bag from the bag filter being selected as a function of the pressure produced by the injector and the source of gas and the expandability of the expandable bag so that the expanded circumference of the expandable bag is greater than the outer circumference of the bag filter. Preferably, the expandable bag is formed from an expandable elastic resilient material. As pointed out below, a plurality of weights are attached to and distributed over the expandable bag. Preferably, the weights are vulcanized on the expandable bag. The expandable bag, which can be at least partially gas permeable is preferably connected to a means for generating a vacuum therein, such as, for example, a piston-cylinder unit, which would, at the same time also serve as source for generating the pressurized gas.

BRIEF DESCRIPTION OF THE DRAWINGS

The present invention will be explained in further detail with reference to the drawings, in which.

DETAILED DESCRIPTION OF THE PRESENTLY PREFERRED EMBODIMENT

Figure 1:
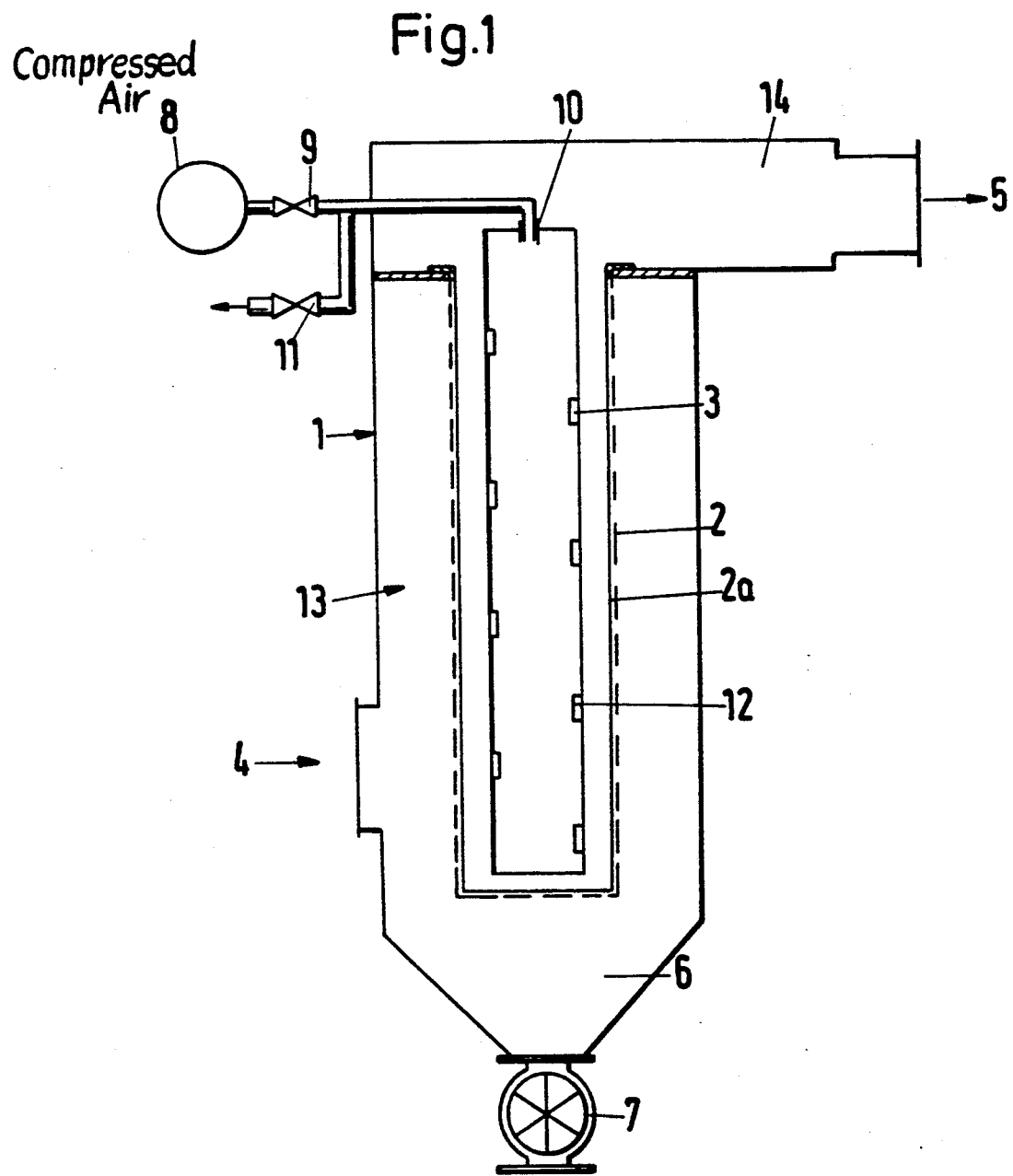
FIG. 1 shows one embodiment of the present invention during filtering operation.

Within a housing 1, a filter bag 2 is pulled over a supporting grid 2a and is so arranged that it divides the housing 1 into a dust space 13 having a crude gas inlet 4, a dust bin 6 and a dust discharge weir 7, and into a clean-space 14 having a clean-gas outlet 5. Axially on the inside of the filter bag 2 there is an expandable bag 3 which is attached to a source of gas under pressure 8 (ordinarily, compressed air) via an injector 10 and a diaphragm inlet valve 9. The expandable bag may be constructed as bellows or it may consist of suitable material which is stretchable in itself.

Instead of the nozzle-shaped injector 10, the compressed air can also be fed via a pipeline which extends over the length of the bag 3 and is provided with a plurality of outlet openings distributed in this region over its circumference. Momentum-increasing weights 12 can be arranged on the bag 3. They may also be distributed uniformly or else be arranged in accordance with the cleaning requirements so as to compensate for possible non-uniform action on the bag filter 2. During the filtering operation, the inlet valve 9 is closed and the outlet valve 11 open. The crude-gas dust deposits on the bag filter 2 while the clean gas is discharged into the atmosphere via the annular space formed by the bag filter 2 and the bag 3 and via the clean-gas collecting space 14 with clean-gas outlet 5.

Figure 2:
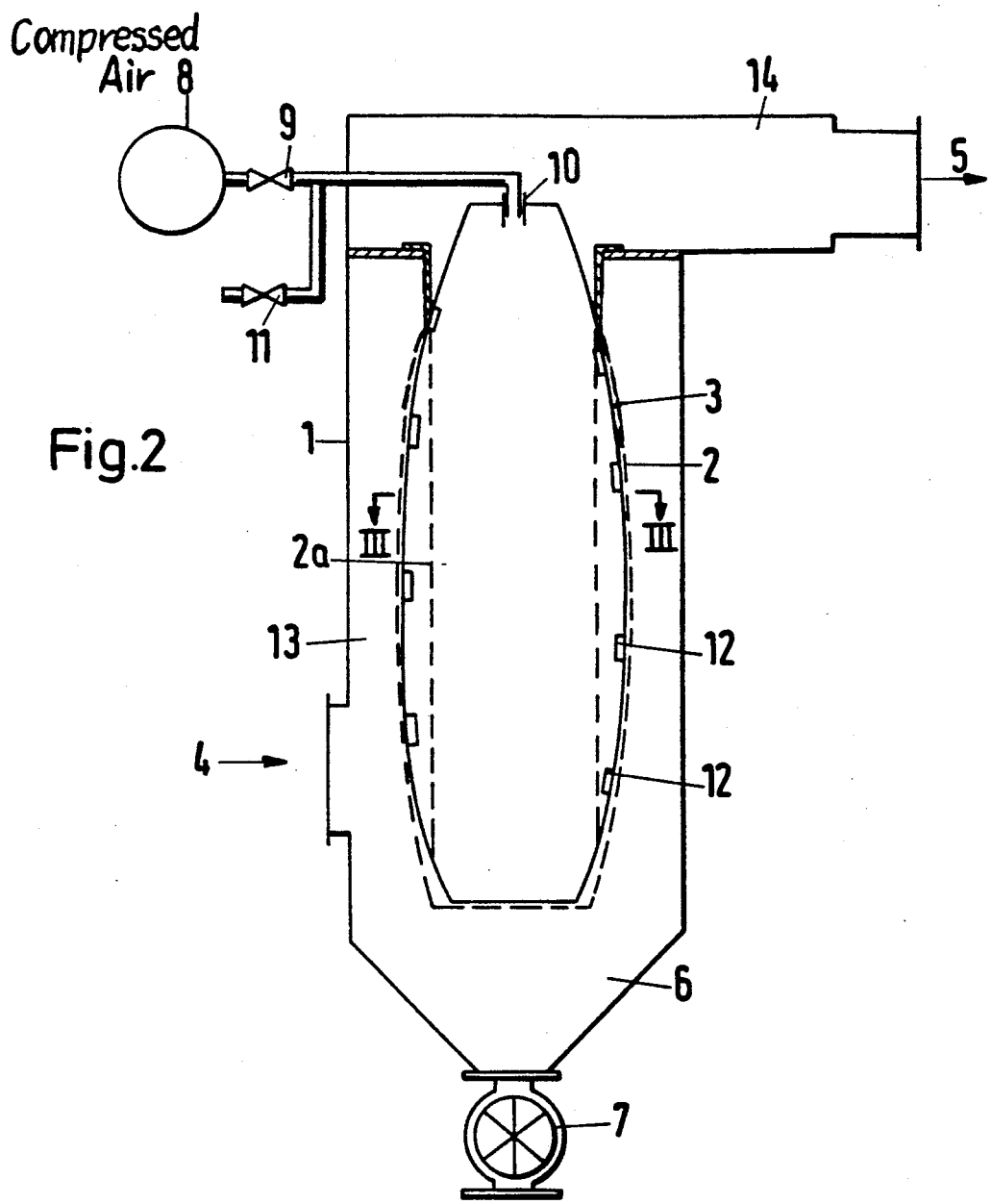
FIG. 2 shows the same embodiment during the cleaning of the filter bag.
Figure 3:
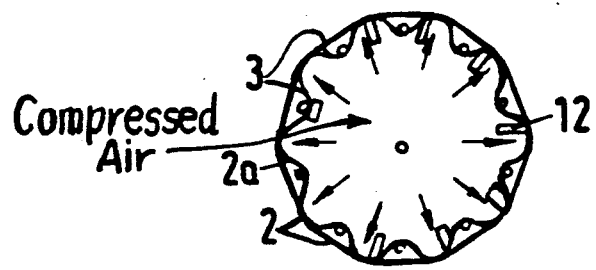
FIG. 3 is a cross-sectional view along the line III—III of FIG. 2.

FIG. 2 shows the cleaning state which is produced for a very short time by opening the inlet valve 9 and closing the outlet valve 11. The bag 3 expands and presses the volume of gas present in the annular space between the bag filter 2 and the bag 3 through the bag filter 2 back into the crude-gas space 13 and impacts against the filter bag 2 pulled over the supporting grid 2a. In the intermediate spaces of the supporting grid 2a, the filter bag 2 is arched out in the form of a garland as shown in the cross-sectional view of FIG. 3. In this way, the dust or the filter cake which has been deposited on the bag filter 2 is detached. The dust drops into the dustbin 6 and is removed via the dust lock 7. Since the speed of expansion of the bag 3 provided for the cleaning can be varied within wide limits by suitable selection of the pressure and amount of the pressure gas without at the same time increasing the amount of pressurized gas which breaks up the filter cake which would flow off without the bag 3 through the bag filter 2, a targeted adaption of the cleaning conditions to the specific properties of the dust can be obtained. This is particularly advantageous in the case of very fine dusts (0.1 to 1.0 μm) in order to remove so-called support-fixed injurious substances. In principle, however, there is the possibility of making the bag 3 itself as permeable as desired, so that the amount of gas passing through the bag filter 2 can also be optimally adapted to the prevailing requirements.

Figure 4:
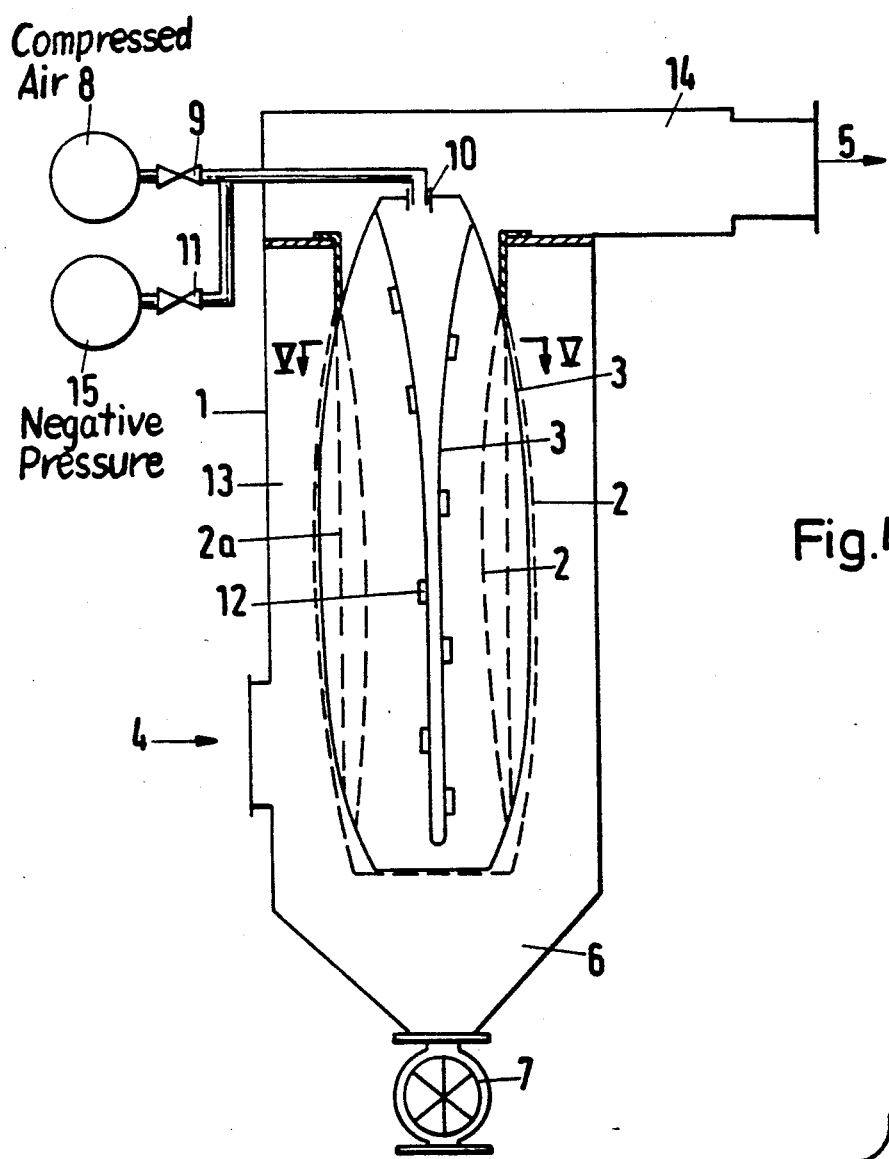
FIG. 4 shows a variant of the embodiment of FIGS. 1 and 2.
Figure 5:
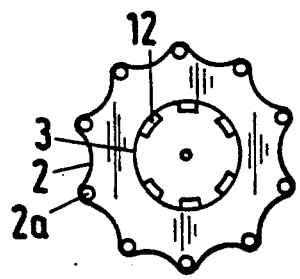
FIG. 5 is a cross-sectional view along the lines V—V of FIG. 4.

FIG. 4 shows how by connecting the outlet valve 11 to a vacuum space 15 the bag is deformed concavely and the bag filter is suddenly pulled concavely into garland shape by the suction thus produced in the annular space between the bag filter 2 and the bag 3. This process can improve the cleaning effect. In this way an increase is also obtained in the annular space between the bag filter 2 and the bag 3, with a corresponding increase in the displacement gas volume which is important for the cleaning, as well as a lengthening of the expansion path of the bag 3 in order to increase the impingement momentum.

In accordance with the present invention, therefore, the cleaning air is not suddenly introduced into the filter bag but into a preferably gas-impervious expansion bag which is arranged axially within the filter bag. If compressed air is introduced into this gas-impervious bag, the bag expands, impacts against the filter bag and arches it outward. In this way, the cleaning effect is produced. The cleaning effect is further supported by the small amount of displacement off-gas which is present in the annular space between the two bags before the start of the cleaning process. This amount of gas is also sufficient to clean the felt or the fabric but it is too small to effectively break up the filter cake. Furthermore, this amount of gas can be increased by predetermining or preselecting the permeability of the expandable bag, if defined.

Since only slight amounts of compressed air, if any, are lost during the cleaning process, a very vigorous cleaning is obtained, which can be varied within wide limits by suitable selection of the amount of compressed air. Furthermore, the length of the bag is also no longer critical and is merely dependent on the ratio of filling volume of the expandable bag to the quantitative flow of compressed air in relation to the desired height of the impact action. By weights which are vulcanized in position, the hammer action upon the expansion acceleration can increase the cleaning action of the stretchable bag (increase in the initial momentum).

In order to increase the amplitude of the expansion, it may be advisable to keep the expandable bag under vacuum when it is at rest, i.e., not in the cleaning cycle. In this way, the annular space as cross section of discharge for the cleaned gas is simultaneously increased.

In the case of a gas-impervious expandable bag, the clean compressed air can be drawn back very rapidly after the expansion, for instance via the suction side of a compressed-air compressor. In this way, similar to a counterflow filter but in substantially more intense fashion, a concave arching of the filter bag is effected immediately after the convex arching, so that particularly intensive cleaning is obtained.

The advantages of the present invention comprise the substantial adaptation of the cleaning conditions to the theoretically possible optimum for the avoidance of further deposits of dust which reduce the efficiency of the filter with, at the same time, the greatest possible protection of the material of the bag. Furthermore, the prior art limitation of the length of the filter bag with respect to jet filters is eliminated.

It should be understood that the preferred embodiments and examples described are for illustrative purposes only and are not to be construed as limiting the scope of the present invention which is properly delineated only in the appended claims.

What is claimed is:

1. A bag filter assembly including a housing; a supporting grid inside the housing; a bag filter having an outer circumference and being arranged on the supporting grid and being sufficiently permeable for permitting a gas to be cleaned to pass therethrough from a crude-gas side outside the supporting grid to a clean-gas side inside the supporting grid; a gas injector for directing a stream of gas under pressure from a pressurized gas generating source into the clean-gas side of the support grid, the assembly comprising:

an expandable bag having an expanded circumference and being disposed at a distance from the filter bag within the clean-gas side of the supporting grid and connected to the gas injector in pressure-tight manner; the distance of the expandable bag from the bag filter being selected as a function of the pressure produced by the injector and the source of the gas and the expandability of the expandable bag so that the expanded circumference of the expandable bag is greater than the outer circumference of the bag filter.

2. The bag filter assembly of claim 1, wherein the expandable bag is formed by an expandable elastic material.

3. The bag filter assembly of claim 1, additionally comprising a plurality of weights attached to and distributed over the expandable bag.

4. The bag filter assembly of claim 3, wherein the weights are vulcanized on the expandable bag.

5. The bag filter assembly of claim 1, wherein the expandable bag is gas permeable.

6. The bag filter assembly of claim 1, additionally comprising means connected to the expandable bag for generating a vacuum therein.

7. The bag filter assembly of claim 6, wherein the pressurized gas generating source and the vacuum generating means comprise a piston-cylinder unit.

* * * * *